March 6, 1956  M. JANCSICS  2,737,046
KEY CARRYING DEVICE
Filed May 26, 1955
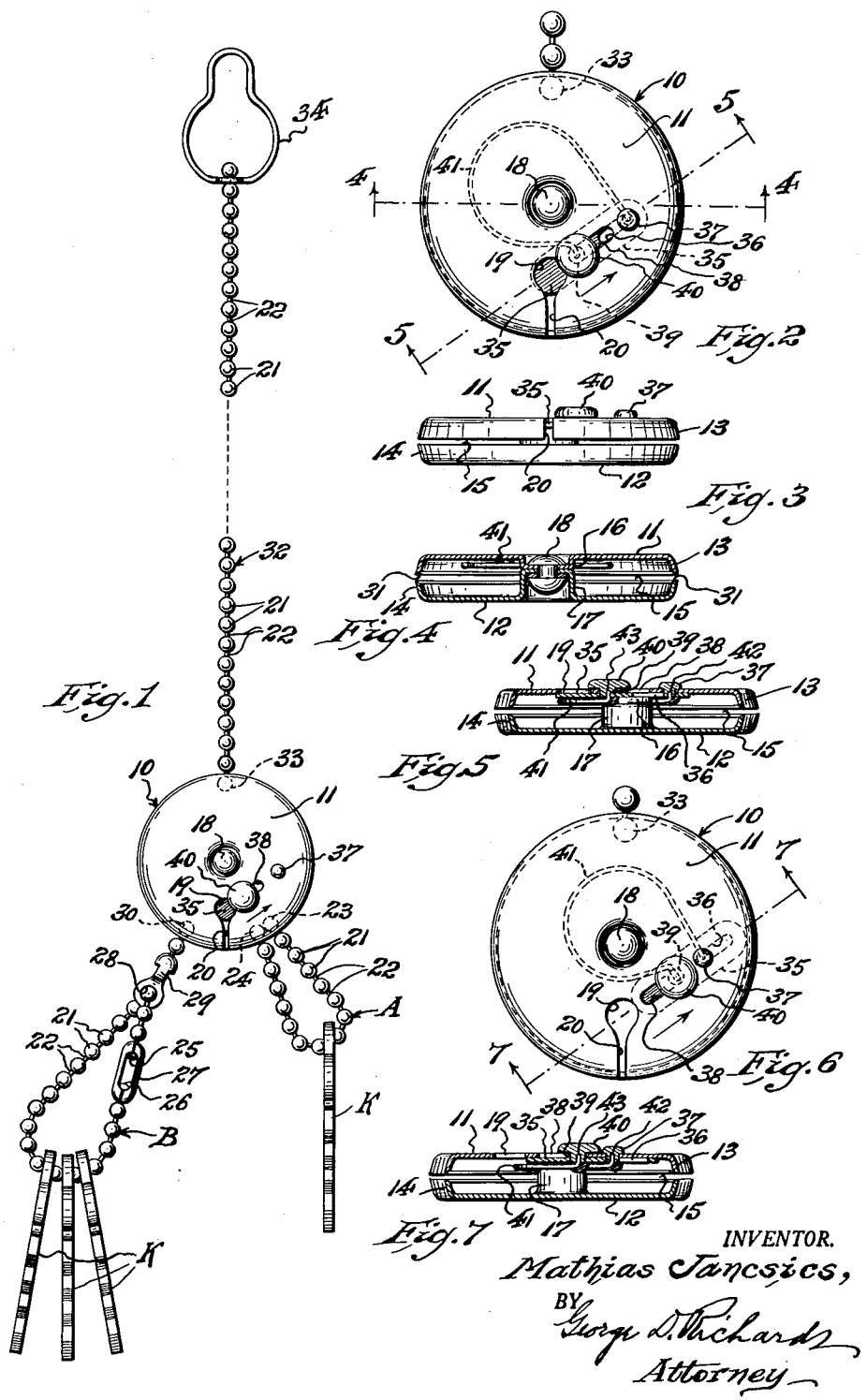
INVENTOR.
Mathias Jancsics,
BY George D. Richards
Attorney

United States Patent Office 2,737,046
Patented Mar. 6, 1956

2,737,046

KEY CARRYING DEVICE

Mathias Jancsics, Newark, N. J.

Application May 26, 1955, Serial No. 511,359

3 Claims. (Cl. 70—457)

This invention relates to improvements in key carrying devices having means to carry a plurality of keys in separated groups or a single key segregated from a group or groups of other keys.

This invention has for an object to provide a key carrying device comprising a plurality of separate key holding bead-chain loops, at least one of which can be used to hold a group of several keys, and at least one other of which can be used to segregate a single frequently required key from the other group or groups of keys for quick selection when use thereof is desired, and including a carrier member common to all said key holding chain loops, to which the latter can be individually attached and detached at will; said carrier member further including, if desired, a suitable length of attachment chain for securing the key carrying device to the user's wearing apparel.

A further object of this invention is to provide the carrier member of the key carrying device with releaseable means operative to normally prevent accidental detachment of the key holding bead-chain loops therefrom, said means being manipulatable to permit individual attachment and detachment of the key holding bead-chain loops to and from the carrier member.

The above and other objects will be understood from a reading of the following detailed description of this invention in connection with the accompanying drawings, in which:

Fig. 1 is a plan view of an illustrative embodiment of the key carrying device according to this invention.

Fig. 2 is a plan view of the carrier member of the key carrying device in its closed condition and drawn on an enlarged scale, the key holding bead-chain loops being omitted; Fig. 3 is an edge elevational view of the same; Fig. 4 is a transverse vertical section taken on line 4—4, in Fig. 2; and Fig. 5 is a transverse vertical section, taken on line 5—5 in Fig. 2.

Fig. 6 is a plan view, similar to that of Fig. 2, but showing the carrier member of the key carrying device in open condition to permit attachment or detachment of key holding bead chain loops relative thereto; and Fig. 7 is a transverse vertical section, taken on line 7—7 in Fig. 6.

Referring to the drawings, in which like characters of reference denote corresponding parts, the reference character 10 indicates the carrier member of the key carrying device, the same comprising opposed top and bottom body sections 11 and 12, respectively, provided with peripheral flanges 13 and 14. These body sections 11 and 12 are suitably secured together in such relation that the margins of their peripheral flanges 13 and 14 are spaced apart to provide a circumferential gap 15 therebetween, which gap extends entirely around the peripheral edge of the carrier member, and so as to open out from the hollow interior of said carrier member. A satisfactory and preferred means for so securing together the body sections 11 and 12 comprises providing the same with centrally disposed, inwardly projecting, respective hollow hub portions 16 and 17, the combined axial dimensions of which, when abutted together, will so space apart said body sections as to form the required circumferential gap 15 between the free margins of the peripheral flanges 13 and 14 thereof. Through the abutting end walls of the hub portions 16 and 17 is passed a fastening rivet 18, or other suitable fastening means, whereby to affix the body sections together in their assembled carrier member forming relation. Instead of employing the fastening rivet 18, or like fastening means, the abutting end walls of said hub portions 16 and 17 can be spot welded together.

Formed in the face wall of one of the body sections of the carrier member, e. g., in that of the top body section 11, is an admission and exit opening 19 of diametric size somewhat in excess of the diameter of bead elements of the bead-chain from which key holding loop and attachment chain members of the key carrying device are made, as will presently appear. Said opening 19 is spaced a suitable distance inwardly from the circumferential edge of said body section. Communicating with said opening 19, to extend radially outward therefrom through the face wall of the body section 11, and through its peripheral flange 13, so as to intersect and thus also communicate with the circumferential gap 15 of the carrier member, is an admission and exit passage 20.

The bead-chain from which key holding loop and attachment chain members are produced comprises hollow spherical metallic beads 21 successively connected together by intermediate headed wire link elements 22 in manner well known to the bead-chain art.

A simple form of key holding loop is indicated by the reference character A (see Fig. 1), and merely comprises a suitable length of bead-chain doubled upon itself to bring together terminal beads 23 and 24 thereof. To attach this form of key holding loop A to the carrier member 10, one terminal bead, e. g. the terminal bead 23, is passed inwardly through the opening 19 of the carrier member so as to enter the same into the interior of said carrier member, and so as to bring the adjacent link element 22 into alignment with the passage 20, whereupon said link element is moved outwardly through said passage 20, and thence into and along the circumferential gap 15, thereby carrying the terminal bead 23 into straddling relation to the peripheral flanges 13 and 14 of the body sections 11 and 12 of the carrier member, so as to be stopped against displacement therefrom. One or more keys K can be now threaded onto the outwardly extending body of the key holding loop A, whereupon the other terminal bead 24 is similarly entered into the interior of the carrier member in coupled relation thereto, thus closing the key holding loop against displacement of the key or keys therefrom, and disposing said loop in outward extension from the carrier member. This simple form of key holding loop is well adapted to hold a single key in segregated relation to other group or groups of keys held by other key holding loops which are also attached to the carrier member.

Another form of key holding loop is indicated by the reference character B (see Fig. 1), and comprises a suitable length of bead-chain doubled upon itself to oppose its terminal beads 25 and 26 for engagement by a closure coupling element 27, that is operative to separably couple together the ends of the loop body. This key holding loop B is threaded through the eye 28 in one end of a hanger element 29, from the opposite end of which extends a short section of bead-chain having a single terminal bead 30. To attach this form of key holding loop to the carrier member 10, the terminal bead 30 is passed inwardly through the opening 19 of the carrier member 10 so as to enter the same into the interior of said carrier member, and so as to bring the link element 22 adjacent said terminal bead 30 into alignment with the passage 20, whereupon said link element is moved outwardly through said passage 20, and thence into and along the circumferential gap 15, so that the terminal bead 30 is supported by the peripheral flanges 13 and 14 of the carrier member. This holding loop B is well adapted to carry a bunch of keys.

The above described holding loops A and B are but illustrative, it will therefore be understood that variations in detail structure and arrangement of holding loops can be made, the only limitation being the provision in connection therewith of one or more terminal beads by which attachment thereof to the carrier member 10 is attained.

It may be here pointed out that it is preferable to provide the peripheral flanges 13 and 14 of the carrier member with downwardly and outwardly chamfered or beveled edges 31 (see Fig. 4), whereby to provide smooth gap bordering seating surfaces for the engaging terminal beads of key holding loops, when said loops are attached to the carrier member.

If desired, the carrier member may be provided with a suitable length of attachment chain 32, having a terminal bead 33 to be entered therein for anchorage thereto. The outer end of said attachment chain 32 is provided with a button engageable loop 34, or other suitable means for attaching said outer end to wearing apparel of the user of the key carrying device.

The carrier member 10 is provided with manually releasable means that is operative to normally close its admission and exit opening 19 against accidental escape therethrough of the terminal beads of the attached key holding loops and attachment chain. Such means is provided by a movable shutter plate 35 that is slidably supported upon the underside of the body section 11 of the carrier member. In an illustrative form thereof, said shutter plate 35 comprises an elongated flat body having a longitudinal guide slot 36 in its rearward end portion, through which extends a stationary stop stud 37 that is affixed to the body section 11 of the carrier member. Said body section 11 is provided with a guide slot 38, that overlies the shutter plate 35, intermediate the admission and exit opening 19 and the stop stud 37. Through said guide slot 38 extends the shank 39 of an external finger piece 40 that is movably supported upon the external face of said body section 11. Said shank 39 is affixed to the shutter plate 35. The shutter plate 35 is yieldably advanced to a normal position in which its forward end portion spans and closes the admission and exit opening 19 (see Figs. 1, 2 and 5), and, to this end, a bow spring 41 is provided, one terminal portion 42 of which is suitably secured to the stationary stop stud 37, and the other portion 43 of which is suitably secured to the shank 39 of the movable finger piece 40, and thus to the shutter plate 35.

To open the opening 19 of the carrier member 10 for admission or withdrawal therethrough of terminal beads of the key holding loops and attachment chain, the user pushes the finger piece 40 in the direction of the arrow inscribed on the external face of the body section 11 (see Figs. 1, 2 and 6) thereby causing rearward sliding movement of the shutter plate 35, which withdraws the forward end portion thereof from its normal covering relation to said opening 19 (see Figs. 6 and 7).

Having now described my invention, I claim:

1. A key carrying device comprising a hollow carrier member having a circumferentially extending gap around its periphery of a width less than the diameters of terminal beads of key holding and other bead-chain formations adapted to be detachably connected to said carrier member for external extension therefrom, a face wall of said carrier member having a terminal bead admission and exit opening and a passage leading outwardly therefrom into said gap, a movable shutter plate underlying said wall, spring means to yieldably urge said shutter plate into closed relation to said admission and exit opening, and means including an external finger piece manipulatable to retract said shutter plate whereby to open said admission and exit opening.

2. A key carrying device comprising a hollow carrier member, at least one key holding loop formed from bead-chain and provided with at least one terminal bead for attaching the same to the carrier member for external extension therefrom, said carrier member having a circumferentially extending gap around its periphery of a width less than the diameter of a key holding loop terminal bead, a face wall of said carrier member having a terminal bead admission and exit opening and a passage leading outwardly therefrom into said gap, a movable shutter plate underlying said wall, spring means to yieldably urge said shutter plate into closed relation to said admission and exit opening, and means including an external finger piece manipulatable to retract said shutter plate whereby to open said admission and exit opening.

3. A key carrying device comprising a hollow carrier member, a plurality of key holding loops formed from bead-chain and having terminal beads for attaching the same to the carrier member for external extension therefrom, said carrier member having a circumferentially extending gap around its periphery of a width less than the diameter of terminal beads of the key holding loops, a face wall of said carrier member having terminal bead admission and exit opening therein and a passage leading outwardly from said opening into said gap, a movable shutter plate underlying said wall, spring means to yieldable urge said shutter plate into closed relation to said admission and exit opening, and means including an external finger piece manipulatable to retract said shutter plate whereby to open said admission and exit opening.

References Cited in the file of this patent

UNITED STATES PATENTS

| | | |
|---|---|---|
| 1,259,388 | Gagnon | Mar. 12, 1918 |
| 1,716,267 | Gagnon | June 4, 1929 |
| 1,814,710 | Komorous | July 14, 1931 |
| 1,896,029 | Gunther | Jan. 31, 1933 |
| 2,525,803 | Johnston | Oct. 17, 1950 |
| 2,557,970 | Jablon | June 26, 1951 |